US012640427B2

(12) United States Patent 
Kim et al.

(10) Patent No.: US 12,640,427 B2 
(45) Date of Patent: May 26, 2026

(54) POUCH-SHAPED BATTERY CELL INCLUDING FOAM LAYER AND BATTERY MODULE INCLUDING THE POUCH-SHAPED BATTERY CELL

(71) Applicant: LG Energy Solution, Ltd., Seoul (KR)

(72) Inventors: Kyoung Ha Kim, Daejeon (KR); Yang Lim Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 775 days.

(21) Appl. No.: 17/921,491

(22) PCT Filed: Jan. 7, 2022

(86) PCT No.: PCT/KR2022/000265 
§ 371 (c)(1), 
(2) Date: Oct. 26, 2022

(87) PCT Pub. No.: WO2022/149892 
PCT Pub. Date: Jul. 14, 2022

(65) Prior Publication Data 
US 2023/0198069 A1     Jun. 22, 2023

(30) Foreign Application Priority Data

Jan. 8, 2021     (KR) ........................ 10-2021-0002833

(51) Int. Cl. 
*H01M 50/105*     (2021.01) 
*H01M 50/124*     (2021.01) 
(Continued)

(52) U.S. Cl. 
CPC ....... *H01M 50/242* (2021.01); *H01M 50/105* (2021.01); *H01M 50/1245* (2021.01); *H01M 50/129* (2021.01)

(58) Field of Classification Search 
CPC ............ H01M 50/105; H01M 50/124; H01M 50/1245; H01M 50/129 
See application file for complete search history.

(56) References Cited

U.S. PATENT DOCUMENTS

2011/0192564 A1     8/2011   Mommer et al. 
2014/0193685 A1     7/2014   Lim 
(Continued)

FOREIGN PATENT DOCUMENTS

CN           107615515 A      1/2018 
CN           209804748 U     12/2019 
(Continued)

OTHER PUBLICATIONS

Search Report dated Dec. 20, 2023 from the Office Action for Chinese Application No. 202280003627.5 issued Dec. 23, 2023, 2 pages. [See p. 1, categorizing the cited references]. 
(Continued)

*Primary Examiner* — Kevin E Yoon 
(74) *Attorney, Agent, or Firm* — Lerner David LLP

(57)     ABSTRACT

The present invention relates to a pouch-shaped battery cell including a battery case made of a laminate sheet including an outer coating layer, a metal layer, and an inner adhesive layer, an electrode assembly received in the battery case, and a foam layer applied to an outer surface of an outer coating layer of any one of a first surface and a second surface of an electrode assembly receiving portion of the battery case. The foam layer buffers expansion in volume of the pouch-shaped battery cell, whereby it is possible to minimize deformation of the pouch-shaped battery cell and a battery module.

12 Claims, 3 Drawing Sheets

(51) Int. Cl.
    H01M 50/129      (2021.01)
    H01M 50/242      (2021.01)

(56)      References Cited

U.S. PATENT DOCUMENTS

| | | |
|---|---|---|
| 2014/0329138 A1 | 11/2014 | Park et al. |
| 2015/0221909 A1 | 8/2015 | Maruoka et al. |
| 2015/0303425 A1 | 10/2015 | Kong |
| 2016/0133883 A1 | 5/2016 | Hwang et al. |
| 2016/0141728 A1* | 5/2016 | Fauteux .............. H01M 10/653 |
| | | 429/61 |
| 2018/0108881 A1 | 4/2018 | Jin et al. |
| 2022/0037725 A1 | 2/2022 | Stanger |
| 2022/0037728 A1* | 2/2022 | Lee ..................... H01M 50/105 |
| 2022/0255182 A1 | 8/2022 | Kogami et al. |
| 2022/0393285 A1 | 12/2022 | Yun et al. |

FOREIGN PATENT DOCUMENTS

| | | |
|---|---|---|
| CN | 111386615 A | 7/2020 |
| JP | 2000173564 A | 6/2000 |
| JP | 2012059379 A | 3/2012 |
| JP | 2012084377 A | 4/2012 |
| JP | 2019067616 A | 4/2019 |
| JP | 2022553155 A | 12/2022 |
| KR | 20090110471 A | 10/2009 |
| KR | 20120058676 A | 6/2012 |
| KR | 20120104592 A | 9/2012 |
| KR | 20130062231 A | 6/2013 |
| KR | 20130090957 A | 8/2013 |
| KR | 20140043535 A | 4/2014 |
| KR | 20140089456 A | 7/2014 |
| KR | 20160054265 A | 5/2016 |
| KR | 20160082073 A | 7/2016 |
| KR | 20170009495 A | 1/2017 |
| KR | 1020170009535 A * | 1/2017 | .......... H01M 2/1016 |
| KR | 20170014309 A | 2/2017 |
| KR | 20170043933 A | 4/2017 |
| KR | 20170045976 A | 4/2017 |
| KR | 20200076282 A | 6/2020 |
| KR | 20200109153 A | 9/2020 |
| WO | 2014045855 A1 | 3/2014 |
| WO | 2020262081 A1 | 12/2020 |

OTHER PUBLICATIONS

International Search Report for Application No. PCT/KR2022/000265 mailed Apr. 11, 2022, pp. 1-3.
Search Report dated Dec. 20, 2024 from the Office Action for Chinese Application No. 202280003627.5 Issued Dec. 23, 2024, pp. 1-2.
Extended European Search Report including Written Opinion for Application No. 22736869.3 dated Jun. 28, 2024, pp. 1-9.

\* cited by examiner

【FIG. 1】
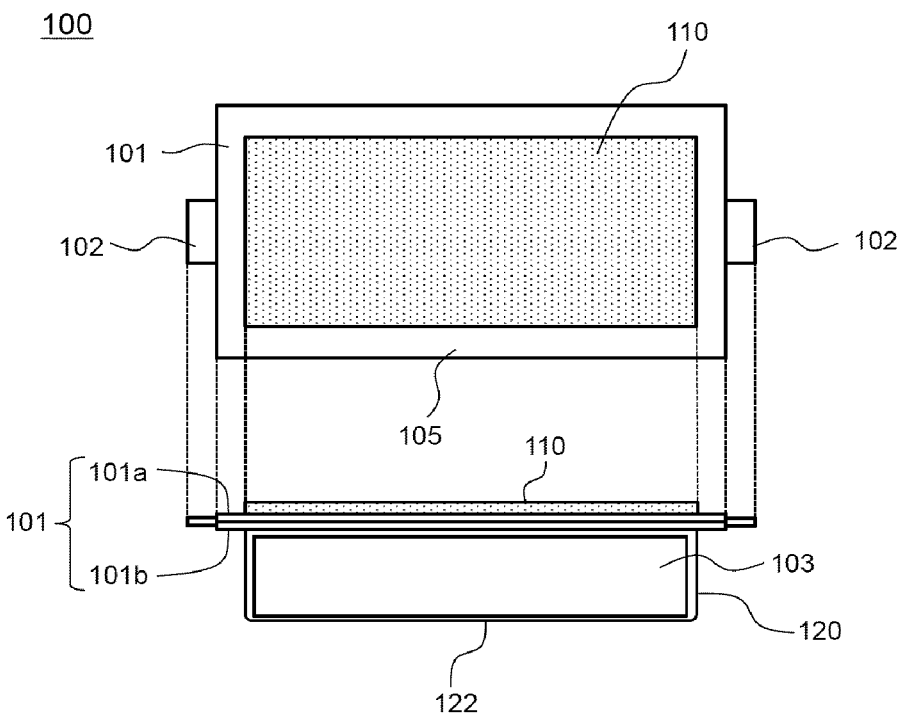
【FIG. 2】
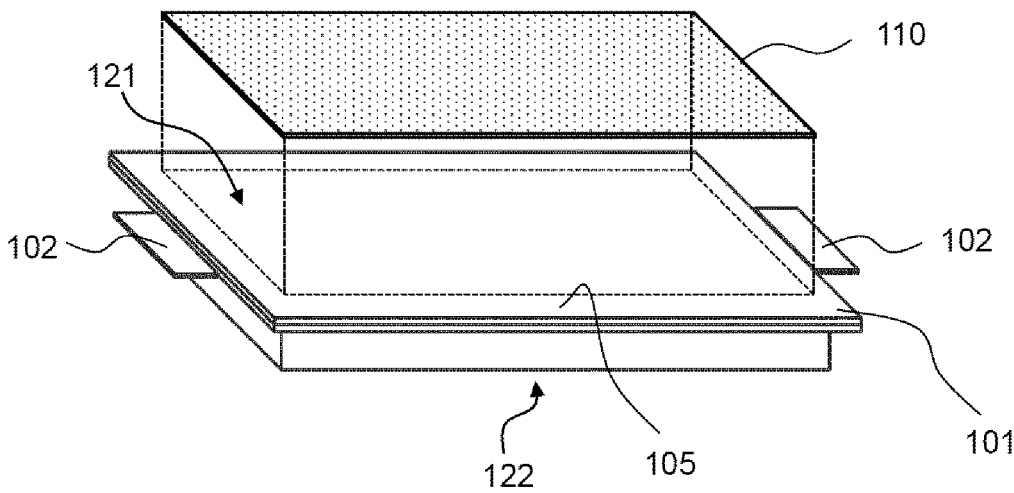

【FIG. 3】
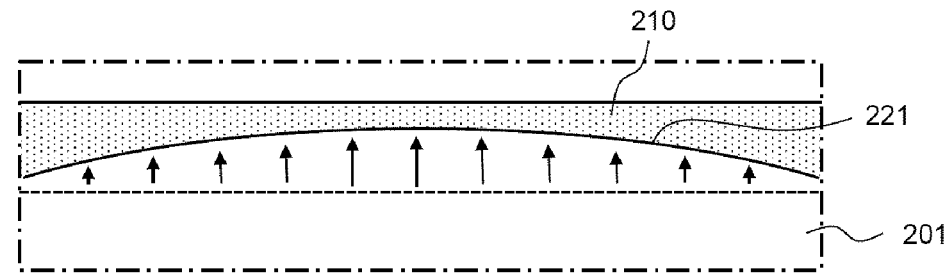
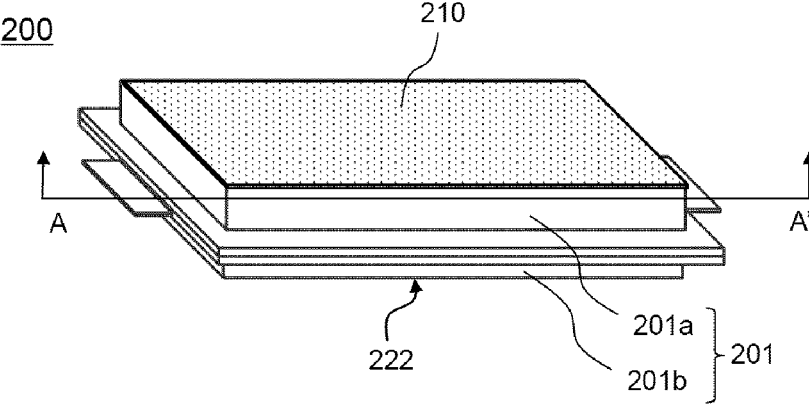
【FIG. 4】
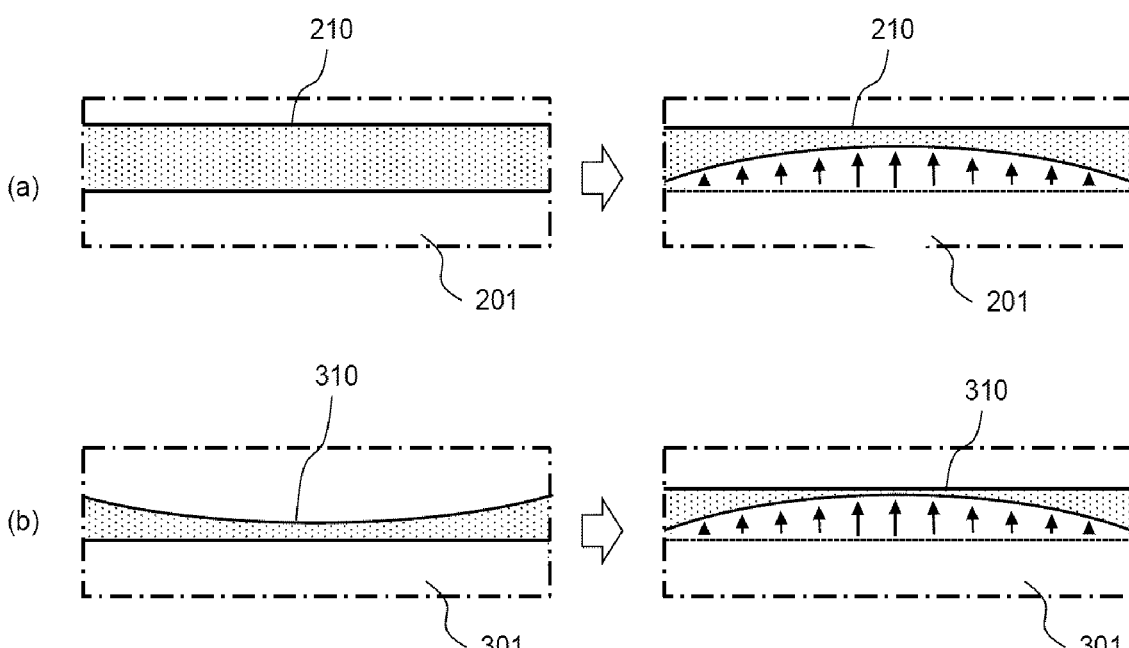

【FIG. 5】
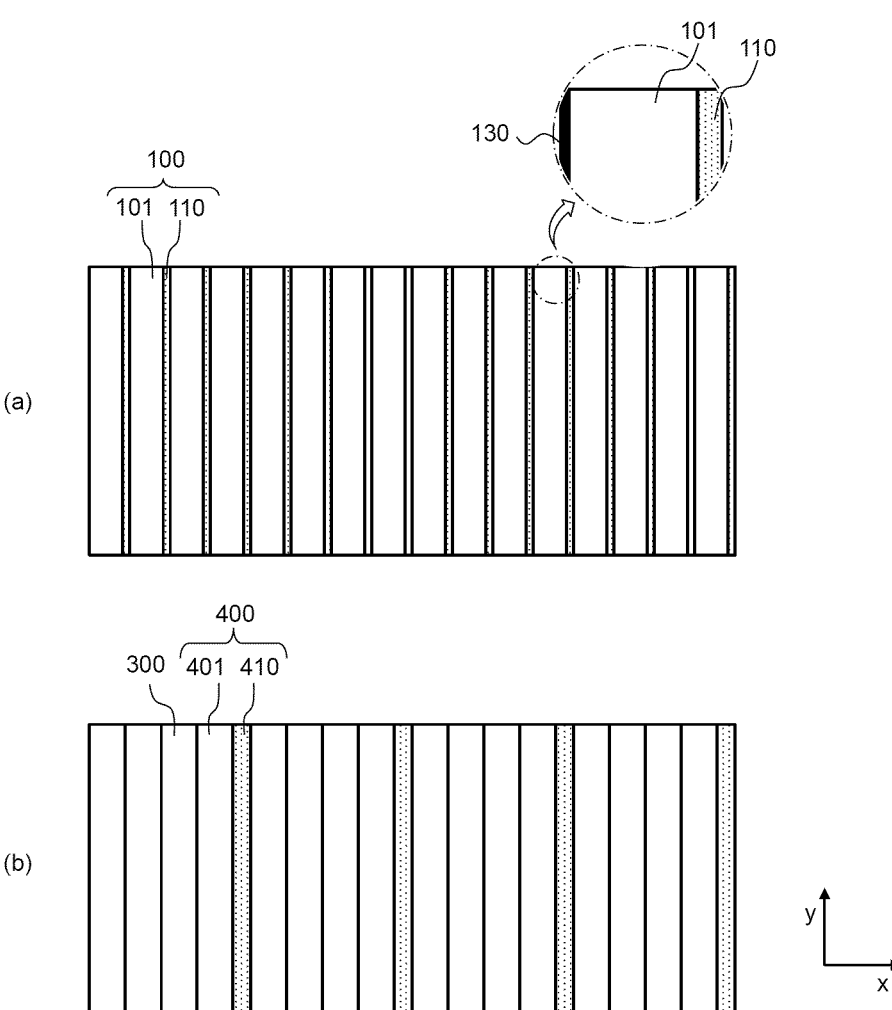

POUCH-SHAPED BATTERY CELL INCLUDING FOAM LAYER AND BATTERY MODULE INCLUDING THE POUCH-SHAPED BATTERY CELL

CROSS-REFERENCE TO RELATED APPLICATIONS

This application is a national stage entry under 35 U.S.C. § 371 of International Application No. PCT/KR2022/000265, filed on Jan. 7, 2022, which claims priority to Korean Patent Application No. 10-2021-0002833, filed on Jan. 8, 2021, the disclosures of which are hereby incorporated herein by reference in their entireties.

This application claims the benefit of priority to Korean Patent Application No. 2021-0002833 filed on Jan. 8, 2021, the disclosure of which is incorporated herein by reference in its entirety.

TECHNICAL FIELD

The present invention relates to a pouch-shaped battery cell including a foam layer and a battery module including the pouch-shaped battery cell. More particularly, the present invention relates to a pouch-shaped battery cell including a foam layer capable of accommodating expansion in volume of the pouch-shaped battery cell without an additional buffer member and a battery module including the pouch-shaped battery cell.

BACKGROUND ART

For medium- or large-sized devices, such as a vehicle or a power storage system, as well as small-sized devices, such as a portable electronic device, a lithium secondary battery is widely used as an energy source. In the case in which a lithium secondary battery is used in medium- or large-sized devices, a plurality of lithium secondary batteries is electrically connected to each other in order to increase capacity and output thereof, and a pouch-shaped secondary battery, which is easy to stack and lightweight, is widely used.

When a battery module or a battery pack is manufactured using the pouch-shaped secondary battery, battery cells are disposed in tight contact with each other in order to increase energy density. Also, in order to increase energy density, a method of reducing an empty space in a battery cell, a battery module, or a battery pack and reducing the volume of an air path may be considered.

The volume of a lithium secondary battery is changed due to expansion and contraction of an electrode assembly during a repeated charging and discharging process. Expansion in thickness of battery cells in a limited space may cause deformation of a battery pack in which the battery cells are arranged in tight contact with each other. In order to prevent this problem, a buffer member may be disposed in a battery cell stack constituted by stacking a plurality of battery cells in order to accommodate or buffer expansion in volume of the battery cells. A foam pad made of polyurethane or silicone may be used as the buffer member.

Since the foam pad cannot be manufactured alone, polyurethane foam is generally applied to and grown on a polyethylene terephthalate (PET) film. In the case in which the foam pad manufactured through the above process is used, it is necessary to perform a foam pad manufacturing process independent of a battery cell manufacturing process. In addition, the volume of the battery cell stack is unnecessarily increased due to the thickness of the PET film used in order to grow the foam pad.

Patent Document 1 discloses a pouch for secondary batteries including a thermal fusion layer, a barrier rubber layer, and an outer protective layer, which are sequentially stacked. In Patent Document 1, a barrier layer made of rubber is provided instead of a barrier layer made of a metal material, and therefore it is not possible to use a laminate sheet including an aluminum layer generally used to manufacture a battery case.

Patent Document 2 discloses a secondary battery including a support case provided so as to surround an electrode assembly and a foam member located between the electrode assembly and the support case.

In Patent Document 2, a foam member capable of absorbing or discharging an electrolytic solution is provided in the battery case in order to minimize performance degradation due to swelling of the electrode assembly; however, technology for buffering expansion of the battery case is not suggested.

Patent Document 3 discloses a secondary battery made of a laminate sheet including an outer coating layer, a metal layer, and a sealant layer, wherein the laminate sheet further includes a shock absorption layer configured to absorb physical shock applied from the outside.

In Patent Document 3, the shock absorption layer is provided between the outer coating layer and the metal layer or between the metal layer and the sealant layer, and therefore a laminate sheet having a shock absorption layer provided therein must be separately prepared in order to manufacture a battery cell.

However, technology capable of using a laminate sheet including an outer coating layer, a metal layer, and an inner adhesive layer, which are generally used, preventing damage to a battery pack due to swelling of a battery cell, and simplifying a battery cell manufacturing process, thereby improving productivity, has not yet been suggested.

PRIOR ART DOCUMENT (Patent Document 1) Korean Patent Application Publication No. 2017-0045976 (2017 Apr. 28) ("Patent Document 1")

(Patent Document 2) Korean Patent Application Publication No. 2020-0109153 (2020 Sep. 22) ("Patent Document 2")

(Patent Document 3) Korean Patent Application Publication No. 2017-0009495 (2017 Jan. 25) ("Patent Document 3")

DISCLOSURE

Technical Problem

The present invention has been made in view of the above problems, and it is an object of the present invention to provide a pouch-shaped battery cell configured such that, even though pouch-shaped battery cells are arranged in tight contact with each other in a batter cell stack without an additional buffer member, expansion in volume of the pouch-shaped battery cells is absorbed, whereby deformation of a battery module is prevented, and a battery module including the pouch-shaped battery cell.

Technical Solution

A pouch-shaped battery cell according to the present invention to accomplish the above object includes a battery case made of a laminate sheet including an outer coating layer, a metal layer, and an inner adhesive layer, an electrode assembly received in the battery case, and a foam layer applied to an outer surface of an outer coating layer of any one of a first surface and a second surface of an electrode assembly receiving portion of the battery case.

The outer coating layer may be configured to have a layered structure including one or more layers, and the outermost layer of the outer coating layer may be made of polyethylene terephthalate (PET).

The foam layer may include polyurethane (PU) foam.

The thickness of the foam layer may be formed to have a thickness deviation depending on the extent of swelling for each region of the battery case.

The thickness of the foam layer may be formed so as to be small at the part of the foam layer at which the battery case greatly swells.

A double-sided tape may be added to the outer surface of the outer coating layer of the first surface or the second surface of the electrode assembly receiving portion to which the foam layer is not added.

The present invention provides a method of manufacturing the pouch-shaped battery cell. Specifically, the method includes a step of receiving an electrode assembly in a battery case made of a laminate sheet and hermetically sealing the battery case and a step of forming a foam layer at an outer surface of the battery case, wherein the foam layer is formed at an outer surface of an outer coating layer of any one of a first surface and a second surface of an electrode assembly receiving portion of the battery case.

The step of forming the foam layer may be a process of forming polyurethane foam.

The method may include a process of attaching a double-sided tape to an outer surface of the first surface or the second surface of the electrode assembly receiving portion at which the foam layer is not formed.

The present invention provides a battery module including at least one pouch-shaped battery cell, the battery module including a battery cell stack constituted by the pouch-shaped battery cells and a module housing configured to receive the battery cell stack, wherein the battery cell stack is configured to have a structure in which the pouch-shaped battery cells are arranged in tight contact with each other without an additional buffer member.

The battery cell stack may include a first battery cell having a foam layer added to an outer surface of a battery case and a second battery cell having no foam layer added thereto.

One first battery cell may be disposed between second battery cells that are successively disposed.

In addition, the present invention provides a method of manufacturing the battery module. Specifically, the method includes a step of preparing a battery cell stack constituted by the pouch-shaped battery cells and a step of receiving the battery cell stack in the module housing, wherein the battery cell stack is configured to have a structure in which the pouch-shaped battery cells are arranged in tight contact with each other without an additional buffer member.

Each of the pouch-shaped battery cells may be configured to have a structure in which a foam layer is applied to an outer surface of an outer coating layer of any one of a first surface and a second surface of an electrode assembly receiving portion of the battery case.

The step of preparing the battery cell stack may be a process of repeatedly performing a process of successively disposing second battery cells each having no foam layer added to the outer surface of the battery case and disposing one first battery cell having a foam layer added to the outer surface of the battery case.

In addition, the present invention may provide various combinations of the above solving means.

Advantageous Effects

As is apparent from the above description, in the present invention, a foam layer is provided at only a part of a pouch-shaped battery cell at which the volume of the pouch-shaped battery cell is greatly changed, whereby it is possible to minimize an increase in weight of the pouch-shaped battery cell due to addition of the foam layer.

In addition, the foam layer is formed on an outer coating layer of the pouch-shaped battery cell, whereby a separate member is unnecessary to form the foam layer.

In addition, a pouch-shaped battery cell having a foam layer formed thereon is completed through a process of forming the foam layer at an outer surface of a battery case of an assembled pouch-shaped battery cell, whereby it is possible to reduce time necessary to separately manufacture a foam pad, and therefore it is possible to reduce manufacturing time.

In addition, the thickness of the foam layer is adjustable in response to the extent of thickness expansion of the battery cell, whereby a foam layer having a predetermined thickness is formed in advance in consideration of swelling characteristics of the battery cell, and therefore it is possible to simplify a process of assembling a battery module.

In addition, both the foam layer and a double-sided tape are provided at the battery case, whereby it is possible to exhibit a function of fixing battery cells together with an effect of alleviating swelling of the battery cell.

DESCRIPTION OF DRAWINGS

FIG. 1 is a plan view and a vertical sectional view of a pouch-shaped battery cell according to a first embodiment.

FIG. 2 is an exploded perspective view of the pouch-shaped battery cell of FIG. 1.

FIG. 3 is a perspective view and a partial enlarged view of a pouch-shaped battery cell according to a second embodiment.

FIG. 4 is a vertical sectional view showing pouch-shaped battery cells according to the second embodiment and a third embodiment before and after swelling thereof.

FIG. 5 is a front view of a battery cell stack according to the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

Hereinafter, embodiments of the present invention will be described in detail with reference to the accompanying drawings.

FIG. 1 is a plan view and a vertical sectional view of a pouch-shaped battery cell according to a first embodiment, and FIG. 2 is an exploded perspective view of the pouch-shaped battery cell of FIG. 1.

Referring to FIGS. 1 and 2, the pouch-shaped battery cell according to the present invention is configured to have a structure in which an electrode assembly 103 is received in a battery case 101 made of a laminate sheet and a foam layer 110 is applied to a part of an outer surface of the battery case 101, i.e. an outer surface of an electrode assembly receiving portion 120.

The electrode assembly 103 may be a bidirectional electrode assembly having electrode leads 102 constituted by a positive electrode lead and a negative electrode lead protruding in opposite directions or a unidirectional electrode assembly having a positive electrode lead and a negative electrode lead protruding in the same direction.

In addition, the kind of the electrode assembly 103 is not particularly restricted. The electrode assembly may be a jelly-roll (wound) type assembly, which is configured to have a structure in which a long sheet type positive electrode and a long sheet type negative electrode are wound in the state in which a separator is interposed therebetween, a stacked type electrode assembly, which is configured to have a structure in which a plurality of positive electrodes cut to a predetermined size and a plurality of negative electrodes cut to a predetermined size are sequentially stacked in the state in which separators are interposed therebetween, a stacked and folded type electrode assembly, which is configured to have a structure in which unit cells, in each of which a predetermined number of positive electrodes and a predetermined number of negative electrodes stacked in the state in which separators are interposed therebetween, are wound using a separator sheet, or a laminated and stacked type assembly, which is configured to have a structure in which the unit cells are stacked in the state in which a separator is interposed therebetween and laminated.

The battery case 101 may be configured to have a structure in which an outer coating layer, an air and moisture blocking metal layer, and a thermally fusible inner adhesive layer are stacked.

The outer coating layer serves to protect the battery cell from the outside. Consequently, it is required for the outer coating layer to exhibit excellent tolerance to the external environment, and therefore excellent tensile strength and weather resistance of the outer coating layer based on the thickness thereof are necessary. For example, a polyester-based resin, such as polyethylene terephthalate (PET), polybutylene terephthalate (PBT), or polyethylene naphthalate (PEN), a polyolefin-based resin, such as polyethylene (PE) or polypropylene (PP), a polystyrene-based resin, such as polystyrene, a polyvinyl chloride-based resin, or a polyvinylidene chloride-based resin may be used. These materials may be used either alone or as a mixture of two or more materials, and may have a layered structure including two or more layers. For example, the outer coating layer may have a layered structure constituted by an oriented nylon (ONy) film and PET, and the outermost layer of the outer coating layer may be constituted by PET.

The metal layer may be made of aluminum (Al) or an aluminum alloy in order to exhibit a function of improving strength of the battery case in addition to a function of preventing introduction of foreign matter, such as gas and moisture, or leakage of an electrolytic solution. Examples of the aluminum alloy may include alloy numbers 8079, 1N30, 8021, 3003, 3004, 3005, 3104, and 3105. These materials may be used either alone or as a combination of two or more materials.

A polymer resin that exhibits thermal fusibility, has low hygroscopicity to the electrolytic solution, and is not expanded or eroded by the electrolytic solution may be used as the inner adhesive layer. For example, the inner adhesive layer may be made of a cast polypropylene (CPP) film.

The foam layer 110, which is a component added to accommodate or alleviate expansion in volume of the pouch-shaped battery cell, may be applied to an outer surface of an outer coating layer of any one of a first surface 121 and a second surface 122 of the electrode assembly receiving portion 120, at which the volume of the pouch-shaped battery cell is greatly changed.

The battery case 101 of the pouch-shaped battery cell 100 shown in FIGS. 1 and 2 includes an upper case 101a and a lower case 101b, wherein the electrode assembly receiving portion 120 is formed in the lower case 101b while no electrode assembly receiving portion is formed in the upper case 101a, and the upper case 101a defines an upper surface of the electrode assembly receiving portion 120. Outer peripheries of the upper case 101a and the lower case 101b are thermally fused to form a sealed portion 105.

Specifically, the foam layer 110 may be formed only at a central part of the first surface 121 of the electrode assembly receiving portion 120 excluding the sealed portion 105, or may be applied to an outer surface of the second surface 122 of the electrode assembly receiving portion 120. Alternatively, the foam layer may be formed at both the first surface 121 and the second surface 122.

Any of materials corresponding to foam polymers may be used as the foam layer 110, which has a structure capable of accommodating the expanding volume of the battery case. For example, polyurethane foam, a foam silicone pad, or polypropylene may be used.

FIG. 3 is a perspective view and a partial enlarged view of a pouch-shaped battery cell according to a second embodiment.

The partial enlarged view, which provided at an upper part of FIG. 3, is a vertical sectional view of the pouch-shaped battery cell 200 shown thereunder, taken along line A-A'.

Referring to FIG. 3, a battery case 201 of the pouch-shaped battery cell 200 includes an upper case 201a and a lower case 201b, wherein an electrode assembly receiving portion is formed in each of the upper case 201a and the lower case 201b.

On the assumption that an upper surface of the electrode assembly receiving portion formed in the upper case 201*a* is a first surface 221 and a lower surface of the electrode assembly receiving portion formed in the lower case 201*b* is a second surface 222, a foam layer 210 may be formed at an outer surface of an outer coating layer of the first surface 221, and a double-sided tape (not shown) may be attached to an outer surface of an outer coating layer of the second surface 222. Alternatively, unlike what is shown in FIG. 3, the foam layer may be formed at the outer surface of the outer coating layer of the second surface 222, and the double-sided tape may be attached to the outer surface of the outer coating layer of the first surface 221.

In the case in which the double-sided tape is attached, relative positions of battery cells may be fixed when battery cells are arranged in tight contact with each other in order to constitute a battery cell stack.

The partial enlarged view provided at the upper part of FIG. 3 shows the state in which the battery case 201 swells. The volume of a central part of the battery case is the most greatly increased. Consequently, a central part of the foam layer 210 is the most greatly compressed. However, the thickness of the foam layer 210 may be configured to be greater than the thickness increment of the battery case such that the overall thickness of the battery cell including the foam layer is not increased even though the volume of the battery case 201 is increased.

FIG. 4 is a vertical sectional view showing pouch-shaped battery cells according to the second embodiment and a third embodiment before and after swelling thereof.

Referring to FIG. 4, (a) of FIG. 4 shows the pouch-shaped battery cell according to the second embodiment shown in FIG. 3 before and after swelling thereof, and (b) of FIG. 4 shows the pouch-shaped battery cell according to the third embodiment before and after swelling thereof.

Referring to (a) of FIG. 4, the foam layer 210 has an overall uniform thickness. The pressure of the central part of the battery case 201, at which the battery case the most greatly swells, against the foam layer 210 is the greatest, and the pressure of the battery case 201 against the foam layer 210 is gradually reduced toward a peripheral part of the battery case. When the battery case 201 swells, therefore, the central part of the foam layer 210 has the smallest thickness and the highest density. Even at this time, however, the overall thickness of the pouch-shaped battery cell including the foam layer may be equal to the overall thickness of the pouch-shaped battery cell including the foam layer before swelling of the battery case.

Referring to (b) of FIG. 4, the thickness of a foam layer 310 is formed so as to have a thickness deviation depending on the extent of swelling for each region of a battery case 301.

Specifically, the thickness of the foam layer 310 is formed so as to be small at the part of the foam layer at which the battery case greatly swells, wherein the thickness of the foam layer 310 attached to the central part of the battery case is less than the thickness of the foam layer 310 attached to a peripheral part of the battery case, and the thickness of the foam layer 310 is gradually increased toward the peripheral part of the battery case.

When the battery case 301 swells, however, the central part of the battery case is convex, since the volume of the central part of the battery case is the most greatly increased. When the battery case swells, as described above, the foam layer is compressed while an inner surface of the central part of the foam layer is deformed convex, whereby an outer surface of the foam layer is deformed flat. In the pouch-shaped battery cell including the foam layer 310, therefore, the thickness of the thickest portion of the battery case before swelling and the thickness of the thickest portion of the battery case after swelling may be equal to each other.

In a concrete example, a method of manufacturing the pouch-shaped battery cell may include a step of receiving an electrode assembly in a battery case made of a laminate sheet and hermetically sealing the battery case and a step of forming a foam layer at an outer surface of the battery case, wherein the foam layer may be formed at an outer surface of an outer coating layer of any one of a first surface and a second surface of an electrode assembly receiving portion of the battery case.

The step of forming the foam layer may be performed through a process of forming polyurethane foam.

In addition, a process of attaching a double-sided tape to an outer surface of the first surface or the second surface of the electrode assembly receiving portion at which the foam layer is not formed may be included.

As described above, the pouch-shaped battery cell according to the present invention is manufactured through the process of forming a foam layer at a first surface or a second surface of an electrode assembly receiving portion, which is an outer surface of a general pouch-shaped battery cell, and therefore the present invention is applicable to a conventional pouch-shaped battery cell.

FIG. 5 is a front view of a battery cell stack according to the present invention.

(a) of FIG. 5 is a front view of a battery cell stack according to a fourth embodiment, and (b) of FIG. 5 is a front view of a battery cell stack according to a fifth embodiment.

Referring to (a) and 5(*b*) of FIG. 5, the battery cell stack of (a) of FIG. 5 is configured such that 16 pouch-shaped battery cells 100 are stacked in tight contact with each other, and the battery cell stack of (b) of FIG. 5 is configured such that a pouch-shaped battery cell 300 having no foam layer added to an outer surface of a battery case 401 and a pouch-shaped battery cell 400 having a foam layer 410 added to an outer surface of a battery case 401 are stacked in tight contact with each other. The battery cell stack may be received in a module housing (not shown) in the state in which the pouch-shaped battery cells are disposed in tight contact with each other without an additional buffer member so as to be assembled as a battery module.

In (a) of FIG. 5, only the pouch-shaped battery cells 100 are provided, wherein a foam layer 110 is added to a right side surface of each pouch-shaped battery cell 100, and a double-sided tape 130 is attached to a left side surface of the pouch-shaped battery cell.

Since the double-sided tape 130 is added, coupling and position fixation between neighboring pouch-shaped battery cells 100 may be easily achieved. Of course, however, a pouch-shaped battery cell having no double-sided tape 130 added thereto falls within the category of the present invention.

In the case in which a battery cell stack is constituted by the same kind of pouch-shaped battery cells, as shown in (a) of FIG. 5, a process of collectively forming foam layers at all of the pouch-shaped battery cells may be performed at the time of manufacture of the pouch-shaped battery cells, whereby processes of manufacturing the pouch-shaped battery cells may be unified.

(b) of FIG. 5 shows a battery cell stack formed by repeatedly performing a process of disposing three pouch-shaped battery cells 300 and one pouch-shaped battery cell 400.

Specifically, one pouch-shaped battery cell 400 may be disposed for three pouch-shaped battery cells 300, and the thickness of the foam layer 410 added to the pouch-shaped battery cell 400 may be a thickness capable of accommodating overall thickness variation when the three pouch-shaped battery cells 300 and the single pouch-shaped battery cell 400 swell.

That is, thickness variation of each pouch-shaped battery cell is set based on the composition or characteristics of the electrode assembly, and the thickness of the foam layer may be set in consideration of the thickness variation.

The x-axis width of each of the battery cell stacks shown in (a) and (b) of FIG. 5 may be uniformly maintained before and after swelling of the pouch-shaped battery cells. Consequently, the external shape of the battery module is not changed in spite of change in volume of the battery cells due to expansion and contraction, whereby it is possible to provide a battery module with improved safety.

A method of manufacturing the battery module according to the present invention may include a step of preparing a battery cell stack constituted by the pouch-shaped battery cells and a step of receiving the battery cell stack in the module housing, wherein the battery cell stack may be configured to have a structure in which the pouch-shaped battery cells are arranged in tight contact with each other without an additional buffer member.

Each of the pouch-shaped battery cells may be configured to have a structure in which a foam layer is applied to an outer surface of an outer coating layer of any one of a first surface and a second surface of an electrode assembly receiving portion of the battery case. Alternatively, each of the pouch-shaped battery cells may be configured to have a structure in which a foam layer is formed at the outer surface of the outer coating layer of any one of the first surface and the second surface and a double-sided tape is attached to the other surface at which the foam layer is not formed.

The step of preparing the battery cell stack may be performed by repeatedly performing a process of successively disposing second battery cells each having no foam layer added to the outer surface of the battery case and disposing one first battery cell having a foam layer added to the outer surface of the battery case at one end of the successively disposed second battery cells.

Alternatively, the step of preparing the battery cell stack may be a process of successively disposing only first battery cells each having a foam layer added to the outer surface of the battery case.

After the battery cell stack is prepared, the battery cell stack may be received in the module housing, or a step of preparing a battery cell stack while receiving individual battery cells in the module housing may be performed.

In the pouch-shaped battery cell and the battery module according to the present invention, as described above, the foam layer is provided at the outer surface of the outer coating layer of any one of the first surface and the second surface of the electrode assembly receiving portion, whereby swelling of the pouch-shaped battery cell may be absorbed and buffered, and therefore it is possible to prevent swelling deformation of the battery module due to change in volume of the pouch-shaped battery cell.

Those skilled in the art to which the present invention pertains will appreciate that various applications and modifications are possible within the category of the present invention based on the above description.

DESCRIPTION OF REFERENCE SYMBOLS

100, 200, 300, 400: Pouch-shaped battery cells
101, 201, 301, 401: Battery cases

101*a*, 201*a*: Upper cases
101*b*, 201*b*: Lower cases
102: Electrode lead
103: Electrode assembly
105: Sealed portion
110, 210, 310, 410: Foam layers
120: Electrode assembly receiving portion
121, 221: First surfaces
122, 222: Second surfaces
130: Double-sided tape

INDUSTRIAL APPLICABILITY

As is apparent from the above description, in the present invention, a foam layer is provided at only a part of a pouch-shaped battery cell at which the volume of the pouch-shaped battery cell is greatly changed, whereby it is possible to minimize an increase in weight of the pouch-shaped battery cell due to addition of the foam layer.

In addition, the foam layer is formed on an outer coating layer of the pouch-shaped battery cell, whereby a separate member is unnecessary to form the foam layer.

In addition, a pouch-shaped battery cell having a foam layer formed thereon is completed through a process of forming the foam layer at an outer surface of a battery case of an assembled pouch-shaped battery cell, whereby it is possible to reduce time necessary to separately manufacture a foam pad, and therefore it is possible to reduce manufacturing time.

In addition, the thickness of the foam layer is adjustable in response to the extent of thickness expansion of the battery cell, whereby a foam layer having a predetermined thickness is formed in advance in consideration of swelling characteristics of the battery cell, and therefore it is possible to simplify a process of assembling a battery module.

In addition, both the foam layer and a double-sided tape are provided at the battery case, whereby it is possible to exhibit a function of fixing battery cells together with an effect of alleviating swelling of the battery cell.

The invention claimed is:

1. A pouch-shaped battery cell comprising:
   a battery case made of a laminate sheet comprising an outer coating layer, a metal layer, and an inner adhesive layer;
   an electrode assembly received in the battery case; and
   a foam layer applied to an outer surface of the outer coating layer of any one of a first surface or a second surface of an electrode assembly receiving portion of the battery case, the first surface and the second surface being opposite one another,
   wherein the foam layer is located only at a central part of the first surface of the electrode assembly receiving portion excluding a peripheral portion of the battery case,
   wherein the foam layer has a thickness that varies across different regions of the battery case, the thickness of the foam layer being smallest at a central part of the foam layer, and
   wherein an entirety of the foam layer is adhered to the first surface of the electrode assembly receiving portion.

2. The pouch-shaped battery cell according to claim 1, wherein the outer coating layer has a layered structure comprising one or more layers, and an outermost layer of the outer coating layer is made of polyethylene terephthalate (PET).

3. The pouch-shaped battery cell according to claim 1, wherein the foam layer comprises polyurethane (PU) foam.

4. The pouch-shaped battery cell according to claim 1, further comprising a double-sided tape attached to the outer surface of the outer coating layer of another one of the first surface or the second surface of the electrode assembly receiving portion opposite from the any one of the first surface or the second surface to which the foam layer is applied.

5. A method of manufacturing the pouch-shaped battery cell according to claim 1, the method comprising:

receiving the electrode assembly in the battery case and hermetically sealing the battery case; and forming the foam layer on the outer surface of the battery case.

6. The method according to claim 5, wherein the forming of the foam layer is a process of forming polyurethane foam.

7. The method according to claim 5, further comprising attaching a double-sided tape to the outer surface of the outer coating layer of another one of the first surface or the second surface of the electrode assembly receiving portion opposite from the any one of the first surface or the second surface to which the foam layer is not applied.

8. A battery module comprising a plurality of first pouch-shaped battery cells each according to claim 1, the battery module comprising:

a battery cell stack constituted by the pouch-shaped battery cells; and a module housing having the battery cell stack received therein, wherein the battery cell stack has a structure in which the pouch-shaped battery cells are arranged in tight contact with each other without an additional buffer member.

9. The battery module according to claim 8, wherein the battery cell stack further comprises at least one second battery cell not having a foam layer added thereto.

10. The battery module according to claim 8, wherein the at least one second battery cell is a plurality of second battery cells, and at least one of the first pouch-shaped battery cells is disposed between adjacent ones of the second battery cells.

11. A method of manufacturing the battery module according to claim 8, the method comprising:

preparing the battery cell stack constituted by the pouch-shaped battery cells; and receiving the battery cell stack in the module housing.

12. The method according to claim 11, wherein the preparing of the battery cell stack includes stacking second battery cells each not having a foam layer added thereto with at least one of the first pouch-shaped battery cells.

\* \* \* \* \*